(12) United States Patent
Lee et al.

(10) Patent No.: US 9,729,840 B2
(45) Date of Patent: Aug. 8, 2017

(54) ELECTRONIC DEVICE HAVING DETACHABLE PROJECTION MODULE

(71) Applicants: Chun-Yi Lee, Hsinchu County (TW); Yong-Ling Zhang, Hsinchu County (TW); Ke-Shiu Chen, Hsinchu (TW)

(72) Inventors: Chun-Yi Lee, Hsinchu County (TW); Yong-Ling Zhang, Hsinchu County (TW); Ke-Shiu Chen, Hsinchu (TW); Feng-Jui Hu, Kaohsiung (TW)

(73) Assignees: Chun-Yi Lee, Hsinchu County (TW); Yong-Ling Zhang, Hsinchu County (TW); Ke-Shiu Chen, Hsinchu (TW)

( * ) Notice: Subject to any disclaimer, the term of this patent is extended or adjusted under 35 U.S.C. 154(b) by 87 days.

(21) Appl. No.: 14/997,568

(22) Filed: Jan. 17, 2016

(65) Prior Publication Data
US 2017/0026625 A1    Jan. 26, 2017

(30) Foreign Application Priority Data
Jul. 20, 2015    (TW) .............................. 104123362 A

(51) Int. Cl.
*H04N 5/64*    (2006.01)
*H04N 9/31*    (2006.01)
*H04M 1/02*    (2006.01)

(52) U.S. Cl.
CPC ........ *H04N 9/3173* (2013.01); *H04M 1/0272* (2013.01)

(58) Field of Classification Search
USPC ....... 348/787, 781, 779, 790, 756, 744, 745, 348/804, 832, 838, 64, 73, 75, 80, 136, 348/158, 185, 333.08, 333.09, 333.1, 335, 348/341, 342, 343, 376, 211.1, 208.11, 348/14.02, 54, 98; 345/7, 8, 39, 166,
(Continued)

(56) References Cited

U.S. PATENT DOCUMENTS 6,332,533 B1 *   12/2001   Howisen ............... G06F 3/0395
                                                         108/14
6,524,122 B1 *   2/2003   Johnson ................. H05K 1/028
                                                         439/131

(Continued)

FOREIGN PATENT DOCUMENTS

TW         201346421 A      11/2013
TW         201504742 A      2/2015

*Primary Examiner* — Jefferey F Harold
*Assistant Examiner* — Mustafizur Rahman
(74) *Attorney, Agent, or Firm* — Chieh-Mei Wang

(57) ABSTRACT

A detachable projection module and an electronic device having the same integrate an optical engine and an image processing unit into an independent detachable module, where the module case is fixedly connected to a device body of the electronic device, so that projection module can receive image signals from the electronic device and convert the received image signals into projection signals to be projected onto a surface near the device body of the electronic device. Through a dedicated or generic connector interface, the detachable projection module may be removed from one electronic device and be mounted to another electronic device, giving an electronic device capability of equipping a projection module to extend the electronic device with a secondary display or empower an electronic device, which has no display at first, with display ability.

6 Claims, 4 Drawing Sheets

(58) Field of Classification Search
USPC .............. 345/175, 634; 361/679.03, 679.02,
361/679.01, 679.09; 353/43, 119;
359/244, 290, 292, 333, 341.33, 443
See application file for complete search history.

(56) References Cited

U.S. PATENT DOCUMENTS

| | | | | |
|---|---|---|---|---|
| 8,546,955 B1* | 10/2013 | Wu | ............. | H01L 23/5384 |
| | | | | 257/686 |
| 2003/0034453 A1* | 2/2003 | Ookubo | ............. | G01Q 60/48 |
| | | | | 850/58 |
| 2004/0190234 A1* | 9/2004 | Lin | ............. | G06F 1/162 |
| | | | | 361/679.28 |
| 2005/0030706 A1* | 2/2005 | Kim | ............. | G06F 1/1601 |
| | | | | 361/679.21 |
| 2005/0240417 A1* | 10/2005 | Savage | ............. | G06Q 10/08 |
| | | | | 705/307 |
| 2007/0047043 A1* | 3/2007 | Kapellner | ............. | G02B 27/0944 |
| | | | | 359/30 |
| 2008/0014995 A1* | 1/2008 | Noba | ............. | H04M 1/0214 |
| | | | | 455/566 |
| 2008/0049044 A1* | 2/2008 | Nitta | ............. | G03B 21/14 |
| | | | | 345/634 |
| 2008/0237416 A1* | 10/2008 | Osada | ............. | F16M 13/00 |
| | | | | 248/176.1 |
| 2008/0247544 A1* | 10/2008 | Candelore | ............. | H04N 7/163 |
| | | | | 380/241 |
| 2012/0052908 A1* | 3/2012 | Kao | ............. | H04M 1/0202 |
| | | | | 455/557 |
| 2012/0057137 A1* | 3/2012 | Enomoto | ............. | H04N 9/3141 |
| | | | | 353/61 |
| 2013/0093909 A1* | 4/2013 | Uchida | ............. | H04N 5/365 |
| | | | | 348/221.1 |
| 2013/0107126 A1* | 5/2013 | Nonomura | ............. | G06F 1/1632 |
| | | | | 348/725 |
| 2013/0215156 A1* | 8/2013 | Li | ............. | G03B 21/14 |
| | | | | 345/690 |
| 2013/0322014 A1* | 12/2013 | Liu | ............. | G06F 1/1632 |
| | | | | 361/679.55 |
| 2014/0057621 A1* | 2/2014 | Ji | ............. | H04M 1/72527 |
| | | | | 455/419 |
| 2014/0118326 A1* | 5/2014 | Ozaki | ............. | G06F 1/3209 |
| | | | | 345/212 |
| 2015/0062790 A1* | 3/2015 | Eldershaw | ............. | G06F 1/163 |
| | | | | 361/679.03 |
| 2015/0134983 A1* | 5/2015 | Samorukov | ............. | H02J 7/0054 |
| | | | | 713/300 |
| 2015/0199166 A1* | 7/2015 | Eguchi | ............. | G06F 3/1454 |
| | | | | 345/2.2 |
| 2015/0222517 A1* | 8/2015 | McLaughlin | ............. | H04L 67/303 |
| | | | | 713/156 |
| 2016/0191876 A1* | 6/2016 | Zhang | ............. | G06F 1/16 |
| | | | | 348/745 |

* cited by examiner

ELECTRONIC DEVICE HAVING DETACHABLE PROJECTION MODULE

BACKGROUND OF THE INVENTION

1. Field of the Invention

The invention relates to an accessory for an electronic device, and more particularly, to a detachable projection module for being installed on a mobile device or electronic device.

2. Description of the Prior Art

Portable devices like mobile phones or wearable devices like smart watches or sport wristbands are in the face of a major technical problem, poor battery time. The display, which will be turned on by frequent incoming notices, is known to be the primary cause when it comes to battery consumption. The capacity limitation of the battery itself also gives the user an experience of short using time. On the other hand, most wearable devices have brought the users even more limitations than mobile phones or tablet computers. For example, only limited information can be displayed due to the overly small size of display, whereas even some wearable devices come with no display at all that they have to connect to a mobile phone or a computer in order to show the information. Besides these no-display wearable devices, many network devices, image-related devices, or communications devices, vehicle electronic devices such as the IP cameras, home video cameras, head-up displays (HUD), etc., will only come with simplified display interface or even no display, which is so limited to have further possible field of application on these devices.

It is, therefore, necessary to provide an effective solution with much flexibility in how a portable device or a wearable device may operate even longer, consume less power, and extend its limited display ability.

SUMMARY OF THE INVENTION

The invention provides a detachable projection module mounted on an electronic device and an electronic device having the same as a solution for the problems as said.

The invention provides in an embodiment a detachable projection module of an electronic device. The electronic device has a first connector and dynamically provides an image signal. The detachable projection module includes a module case, an optical engine, and an image processing unit. The module case has a second connector detachably connected to the first connector so as to receive the image signal from the electronic device. The detachable projection module is fixedly attached to the electronic device when the second connector is connected to the first connector. The optical engine and the image processing unit are disposed within the module case. The image processing unit is utilized for converting the image signal to a projection signal usable for the optical engine. The optical engine projects on a surface adjacent to the electronic device a projection image that corresponds to the projection signal.

The invention provides in another embodiment an electronic device having a detachable projection module. The electronic device includes a device body and a detachable projection module. The device body includes a first connector. The device body dynamically provides an image signal. The detachable projection module includes a module case, an optical engine, and an image processing unit. The module case has a second connector detachably connected to the first connector so as to receive the image signal from the device body. The detachable projection module is fixedly attached to the device body when the second connector is connected to the first connector. The optical engine and the image processing unit are disposed within the module case. The image processing unit is utilized for converting the image signal to a projection signal usable for the optical engine. The optical engine projects on a surface adjacent to the device body a projection image that corresponds to the projection signal.

For the detachable projection module and the electronic device of the invention, the projection image is the only display image of the electronic device.

For the detachable projection module and the electronic device of the invention, the electronic device includes a display for providing a first display image and the projection image provides a second display image.

For the detachable projection module and the electronic device of the invention, the image signal is variable dynamic images or variable static images. The detachable projection module projects in real-time the projection image that corresponds to the projection signal through the optical engine.

For the detachable projection module and the electronic device of the invention, the optical engine is a laser optical engine, a digital light processing (DLP) optical engine, or a liquid crystal on silicon (LCOS) optical engine.

For the detachable projection module and the electronic device of the invention, the electronic device is a wearable device, a mobile communications device, a network communications device, or a vehicle electronic device, and the detachable projection module is a projection module mounted on the wearable device, the mobile communications device, the network communications device, or the vehicle electronic device.

For the detachable projection module and the electronic device of the invention, the electronic device further includes a display. When the second connector is not connected to the first connector, the detachable projection module displays image through the display and/or displays the projection image through the optical engine.

For the detachable projection module and the electronic device of the invention, the electronic device further includes a converter having a third connector and a fourth connector. The fourth connector is fixedly connected to the second connector and the third connector is fixedly connected to the first connector, and the third connector and the fourth connector are of different specifications.

Through a dedicated or generic connector interface, the detachable projection module may be removed from one electronic device and be mounted to another electronic device, giving an electronic device capability of equipping a projection module to extend the electronic device with a secondary display or empower an electronic device, which has no display at first, with display ability.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. Also, the term "couple" is intended to mean either an indirect or direct electrical/mechanical connection. Thus, if a first device is coupled to a second device, that connection may be through a direct electrical/mechanical connection, or through an indirect electrical/mechanical connection via other devices and connections.

Figure 1:
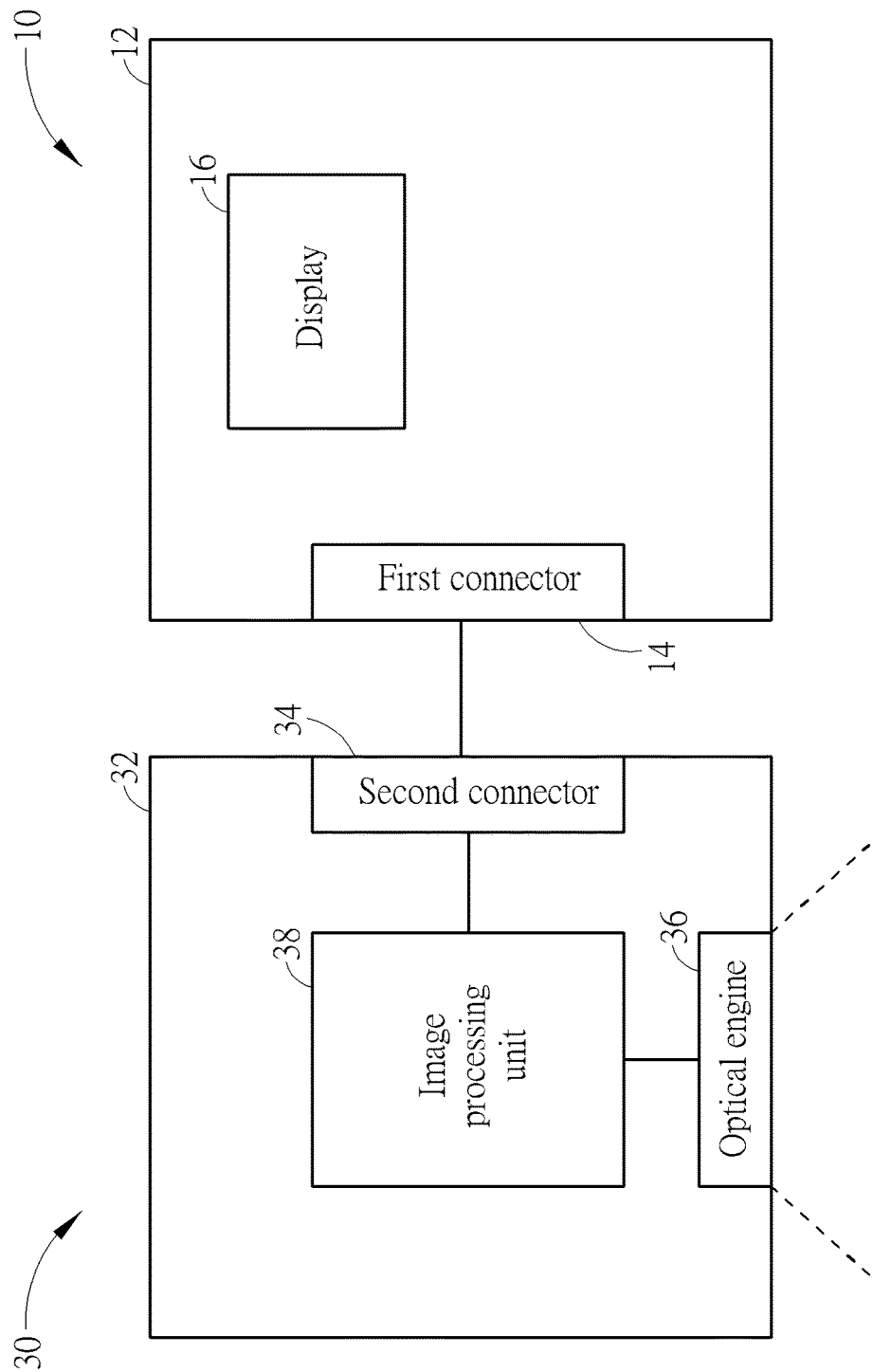
FIG. 1 is an illustration of a first embodiment of a detachable projection module and an electronic device of the invention.

Please refer to FIG. 1. FIG. 1 is an illustration of a first embodiment of a detachable projection module and an electronic device of the invention. A detachable projection device 30 is adaptive to be mounted on an electronic device 10 so that the electronic device 10 may be equipped with projection function. The electronic device 10 may be a wearable device, a mobile communications device, a network communications device, or a vehicle electronic device, for example, a mobile phone, a tablet computer, a laptop computer, a personal digital assistant (PDA), a navigation device, a smart watch, a sport watch, etc. For the embodiment in FIG. 1, the electronic device 10 has a display 16 on a device body 12. The display 16 provides a first display image just as most electronic devices 10 as listed are equipped with the display 16, which providing the first display image as the primary display image of electronic device 10. However, some electronic devices 10, such as some sport wristbands, wearable devices, IP cameras, etc., may have no display 16 on their own. The device body 122 of the electronic device 10 further has a first connector 14 that can dynamically provide an image signal and the image signal may contain variable dynamic images such as a movie, an animation clip, a video stream, desktop or application of the O.S. of a computer, or variable static mages such as a photo, picture, or any unchanging screen content.

The detachable projection module 30 provides the electronic device 10 with an image output solution, in the form of an attachable module, other than the display 16. In the invention, the detachable projection module 30 includes a module case 32, an image processing unit 36, and an optical engine 38. The module case 32 is equipped with a second connector 34. The image processing unit 36 and the optical engine 38 are disposed within the module case 32, and the entire detachable projection module 30 is directly, detachably connected to the first connector 14 via the second connector 34 to receive the image signal from the electronic device 10. The image signal provided by the electronic device 10 through the first connector 14 is processed and converted by the image processing unit 36 to a projection signal usable for the optical engine 38 and the optical engine 38 projects accordingly a projection image that corresponds to the projection signal on a surface adjacent to the electronic device 10 in real time. In other words, for the electronic device 10, such as the mobile phone, the tablet computer, or the smart watch, that has the display 16 of its own to provide the first display image as the main display image, the detachable projection module 30 can be recognized as a second display to project the projection image on the surface adjacent to the electronic device 10 as a second display image, where the 'second' is to show distinction from the first display image provided by the display 16. It should be noted that the second display image projected by the detachable projection module 30 can be the same as the first display image or preferably, can contain additional information other than the first display image or simplified content of the first display image provided by the display 16. For the electronic device 10 without a display 16, such as a sport wristband or device to be expanded with display function like some network device, image-related device, or communications device, vehicle electronic device such as IP camera, home video camera, head-up display (HUD), etc., the projection image projected by the detachable projection module 30 is the only display image of the electronic device 10.

Since the detachable projection module 30 of the invention is preferably mounted on electronic devices 10 like a wearable device or a mobile communications device, the detachable projection module 30 is practically an expansion micro-sized projection module. Hence, the detachable projection module 30 will be fixedly attached to the electronic device 10 and treated as an expansion module when the second connector 34 of the detachable projection module 30 is connected to the first connector 14. It should also be noted that in a preferred embodiment of the invention, the optical engine 36 of the detachable projection module 30 can be a laser optical engine that doesn't have to focus, so as to cooperate with the wearable device or the mobile communications device and to project a clear, proper-sized second display image, preferably with the size between a watch and a tablet computer, on the adjacent arm surface or desk surface. However, it is also a possible choice that the optical engine 36 of the detachable projection module 30 be a digital light processing (DLP) optical engine or a liquid crystal on silicon (LCOS) optical engine.

Figure 2:
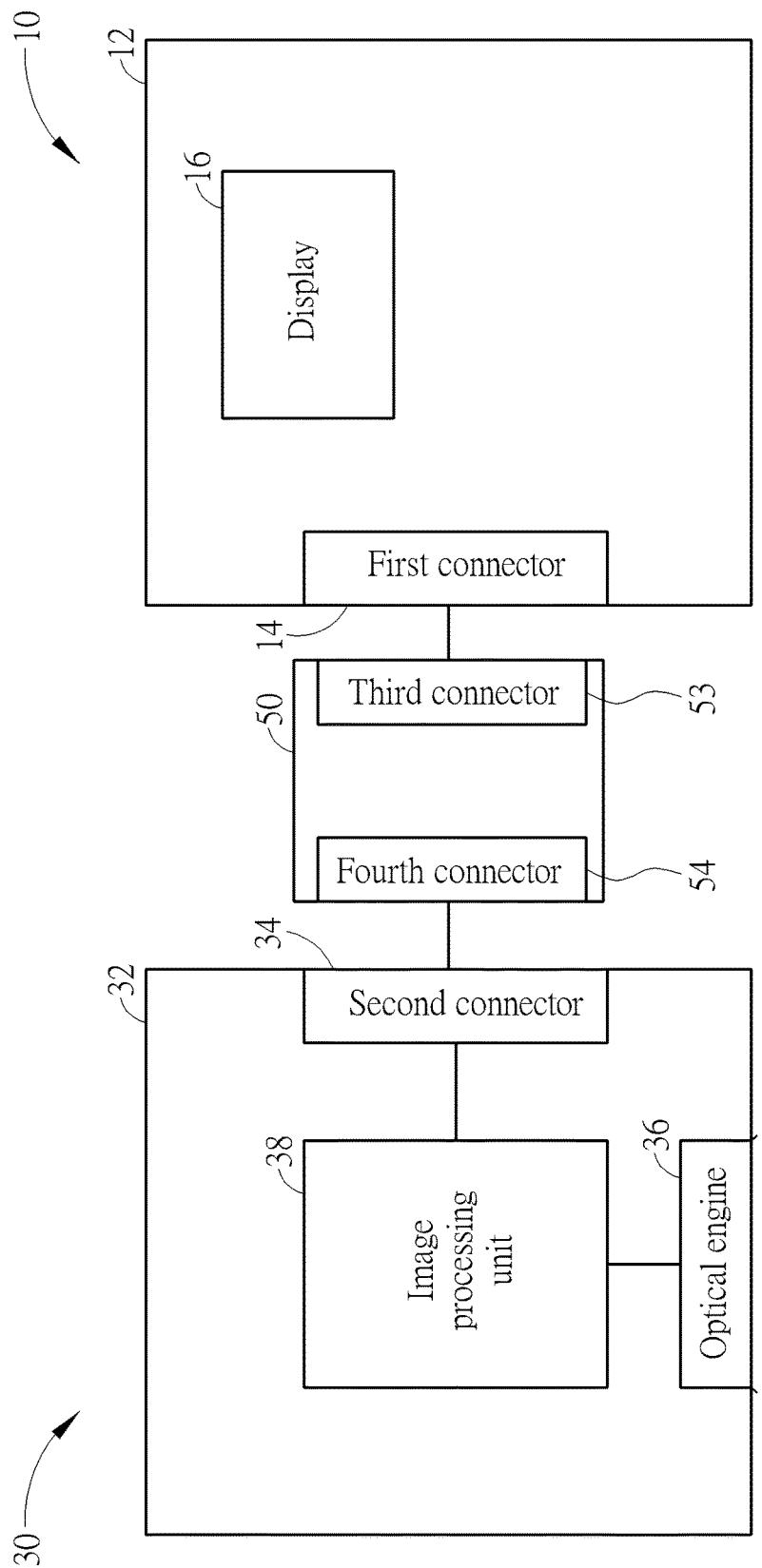
FIG. 2 is an illustration of a second embodiment of the detachable projection module and the electronic device of the invention.

Please refer to FIG. 2. FIG. 2 shows an illustration of a second embodiment of the detachable projection module and the electronic device of the invention. The second embodiment discloses an electronic device 10 having the detachable projection module 30 and besides the device body 12 and the detachable projection module 30 as the first embodiment, the electronic device 10 further includes a converter 50 for the conversion of the connector types between the detachable projection module 30 and the device body 12. The converter 50 has a third connector 53 and a fourth connector 54. When the detachable projection module 30 is to be fixed and connected to the device body 12 of the electronic device 10 via the converter 50, the fourth connector 54 will be fixedly connected to the second connector 34 and the third connector 53 will be fixedly connected to the first connector 14. Preferably, the third connector 53 and the fourth connector 54 are of different specifications, i.e., the second connector 34 of the detachable projection module 30 is different in specification from the first connector 14 of the device body 12. In an embodiment, for example, the detachable projection module 30 may use the Mobile Industry Processor Interface (MIPI) as the second connector 34 (same for the fourth connector 54) and with the converter 50 providing the third connector 53 in the form of USB family interface, HDMI, RS-232, or analog interface, etc., the detachable projection module 30 may be connected to the device body 12 coming with first connector 14 that has corresponding interface.

Additionally, the detachable projection module 30 is able to be removed from one electronic device 10 and mounted to another electronic device 10. The converter 50 can be selectively used for interface conversion if the second connector 34 of the detachable projection module 30 has different specification from the first connector 14 of the electronic device 10. For those second connector 34 and first connector 14 having same interface specification, the detachable projection module 30 can be directly mounted to the electronic device 10 without further using the converter 50.

Figure 3:
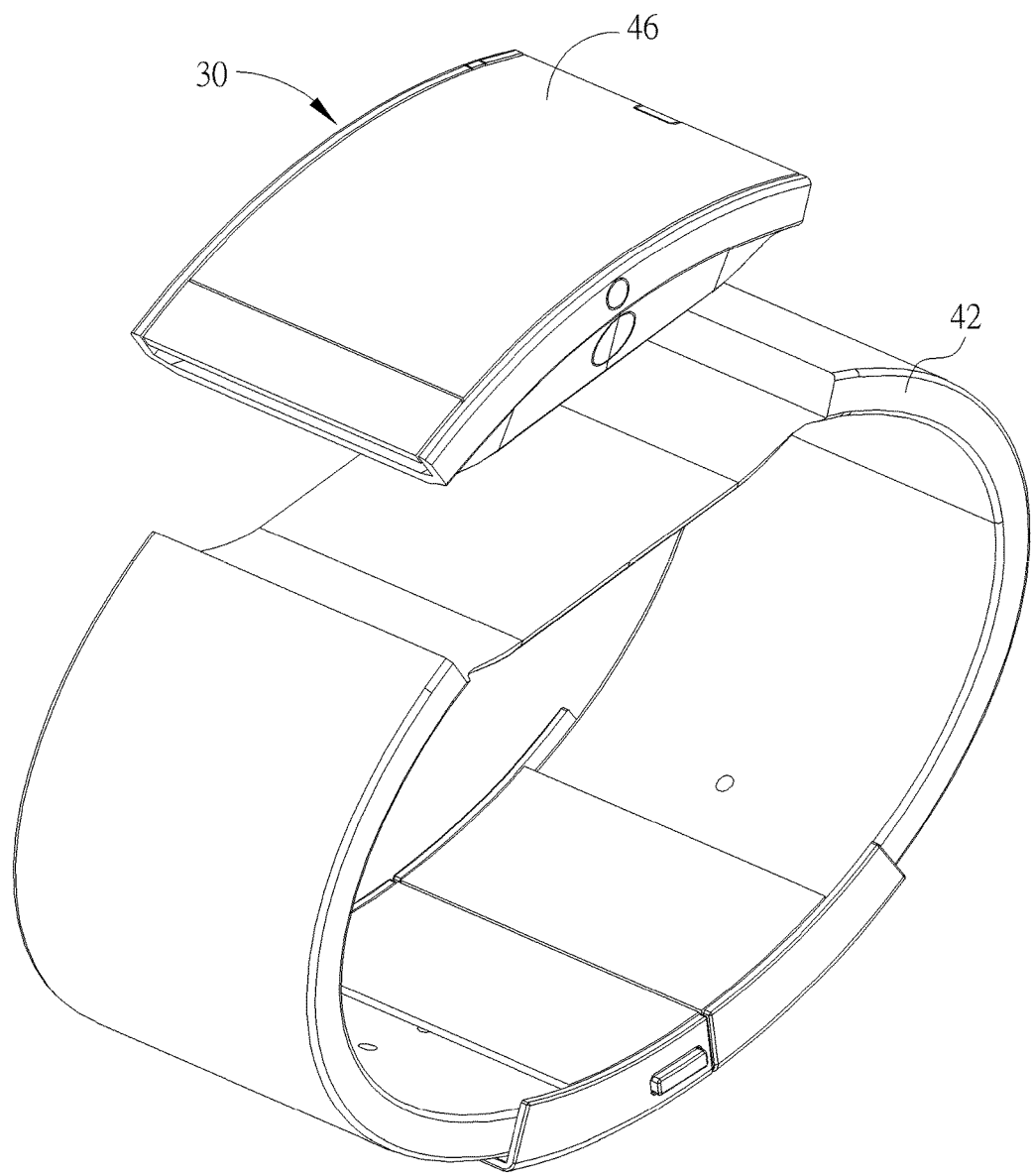
FIG. 3 is an illustration of a practical implementation of the detachable projection module according to the invention.
Figure 4:
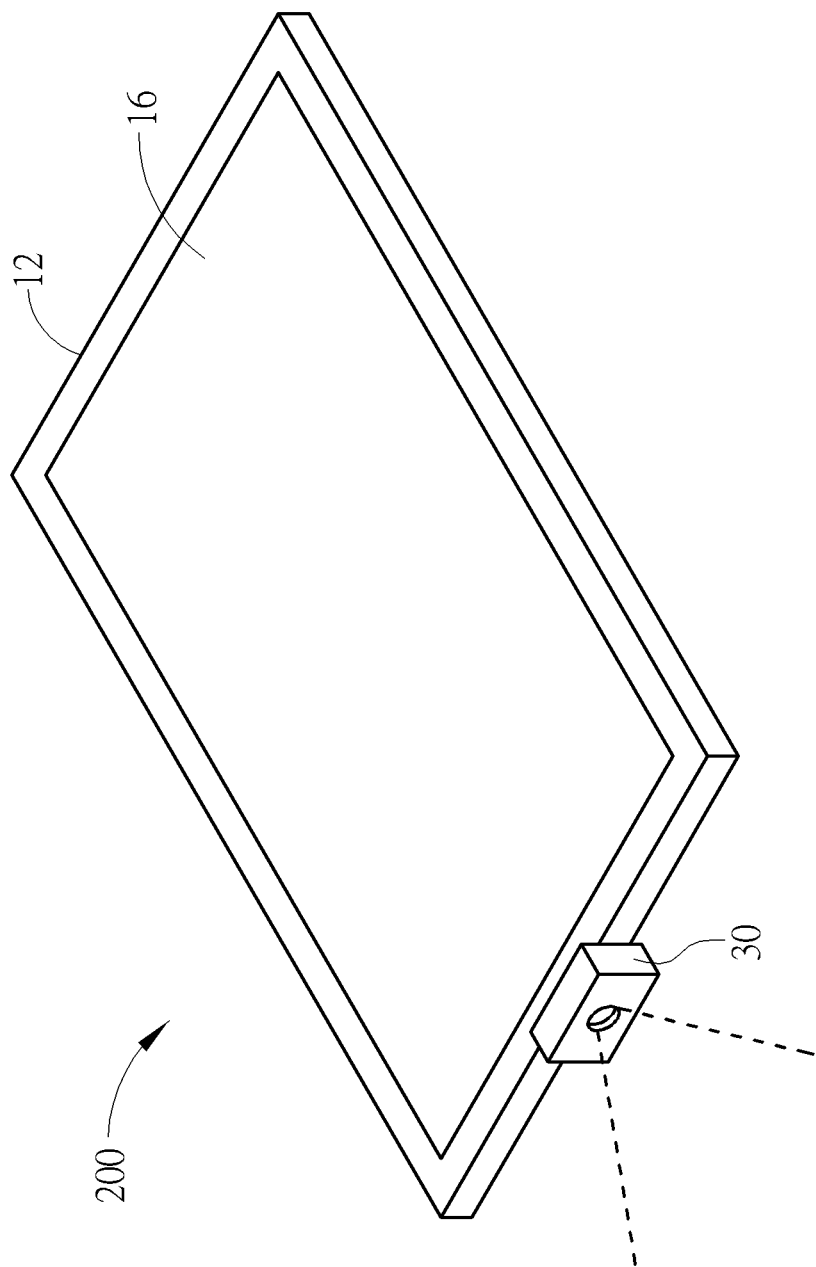
FIG. 4 is an illustration of a practical implementation of the electronic device having the detachable projection module according to the invention.

Please refer to FIG. 3 and FIG. 4. FIG. 3 is an illustration of a practical implementation of the detachable projection module according to the invention, and FIG. 4 is an illustration of a practical implementation of the electronic device having the detachable projection module according to the invention. As in FIG. 3, the detachable projection module 30 is in the form of a smart watch, which is detachably mounted on an armband 42. The detachable projection module 30 is incorporated with the functions of a smart watch and has a display 46 of it own that can display images. A projection image is provided by the detachable projection module 30. For the embodiment, it can be one from the display 46 and the optical engine of the detachable projection module that provides the display image, or both the display 46 and the optical engine provide synchronous display image, or even both the display 46 and the optical engine provide display images at the same time, as two different display images. The detachable projection module 30 can have battery of its own and be self-powered. It can also get power from a built-in power of the armband 42 when attached to the armband 42. The detachable projection module 30 can be removed from the armband 42 to be mounted to another electronic device 10, which is not shown in the figure, and receive image signals from the electronic device 10 to project a corresponding projection image on a surface adjacent to the electronic device 10.

As in FIG. 4, the electronic device 200 is a smart phone, with the device body 12 equipped with the display 16 for providing the first display image. As the detachable projection module 30 is mounted to the device body 12, no further converter needed since the detachable projection module 30 and the device body 12 have same connectors, the detachable projection module 30 is ready to serve as an alternative 'display' other than the display 16 and provide the second display image. The detachable projection module 30 of the invention may also be mounted as an expansion module on network device, image device, communications device, or vehicle electronic device such as an IP camera, a home video camera, a HUD, etc. For example, Most home cameras do not come with a projection function. With the detachable projection module 30, a home camera, placed in a baby's room, will be able to project still images or dynamic videos of the parent to sooth the baby. As for the occurrence of home intrusion event, a premade video or instant video can be projected by the detachable projection module 30 for warning purpose. The detachable projection module 30 may also be plugged into a reserved connector on the center stack of a vehicle and project images on the windshield as a purpose of HUD.

The detachable projection module and the electronic device having such detachable projection module provided in the invention integrate the optical engine and the image processing unit into an independent detachable module, where the module case is fixedly connected to the device body of the electronic device, so that projection module can receive image signals from the electronic device and convert the received image signals into projection signals to be projected onto a surface near the device body of the electronic device. Through a dedicated or generic connector interface, the detachable projection module may be removed from one electronic device and be mounted to another electronic device, giving an electronic device capability of equipping a projection module to extend the electronic device with a secondary display or empower an electronic device, which has no display at first, with display ability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
   a device body comprising a first connector, the device body dynamically providing an image signal; and
   a detachable projection module, comprising:
      a module case, having a second connector detachably connected to the first connector so as to receive the image signal from the device body, the detachable projection module fixedly attached to the device body when the second connector is connected to the first connector;
      an optical engine disposed within the module case; and
      an image processing unit disposed within the module case, the image processing unit utilized for converting the image signal to a projection signal usable for the optical engine;
      wherein the optical engine projects on a surface adjacent to the device body a projection image that corresponds to the projection signal, the device body has no display, and the projection image is the only display image of the electronic device.

2. The electronic device of claim 1, wherein the image signal is variable dynamic images or variable static images, the detachable projection module projecting in real-time the projection image that corresponds to the projection signal through the optical engine.

3. The electronic device of claim 1, wherein the optical engine is a laser optical engine, a digital light processing (DLP) optical engine, or a liquid crystal on silicon (LCoS) optical engine.

4. The electronic device of claim 1, wherein the electronic device is a sport wristband, a wearable device, or an IP camera, and the detachable projection module is a projection module mounted on the sport wristband, the wearable device, or the IP camera.

5. The electronic device of claim 1, further comprising a converter having a third connector and a fourth connector, the fourth connector fixedly connected to the second connector and the third connector fixedly connected to the first connector.

6. The electronic device of claim 1, wherein the third connector and the fourth connector are of different specifications.

* * * * *